United States Patent
Neuhaus

(10) Patent No.: US 12,486,757 B2
(45) Date of Patent: Dec. 2, 2025

(54) MEASURING DEVICE FOR A CASING OF A DEEP BORING

(71) Applicant: Guido Neuhaus, Dülmen (DE)

(72) Inventor: Guido Neuhaus, Dülmen (DE)

(73) Assignee: RWE Gas Storage West GmbH, Essen (DE)

( * ) Notice: Subject to any disclaimer, the term of this patent is extended or adjusted under 35 U.S.C. 154(b) by 204 days.

(21) Appl. No.: 18/510,010

(22) Filed: Nov. 15, 2023

(65) Prior Publication Data

US 2024/0084693 A1 Mar. 14, 2024

Related U.S. Application Data

(63) Continuation of application No. PCT/EP2022/061658, filed on May 2, 2022.

(30) Foreign Application Priority Data

May 31, 2021 (DE) .................. 10 2021 113 965.1

(51) Int. Cl.
*E21B 47/017* (2012.01)
*B60L 53/62* (2019.01)
(Continued)

(52) U.S. Cl.
CPC ............ *E21B 47/017* (2020.05); *B60L 53/62* (2019.02); *B60L 53/665* (2019.02); *E21B 41/02* (2013.01);
(Continued)

(58) Field of Classification Search
CPC ........ E21B 47/017; E21B 41/02; E21B 47/00; G01N 17/006; G01N 27/041;
(Continued)

(56) References Cited

U.S. PATENT DOCUMENTS

| 5,195,392 A | 3/1993 | Moore et al. |
| 2008/0087423 A1* | 4/2008 | Wylie .................. E21B 43/103 166/254.2 |

(Continued)

FOREIGN PATENT DOCUMENTS

| CH | 698311 B1 | 7/2009 |
| CH | 708614 A2 | 3/2015 |

(Continued)

OTHER PUBLICATIONS

Dennis B. et al.: "Better Cathodic Protection Of Well Casings With Wireline Evaluation", Petroleum Engineer International, Hart Publications, vol. 62, No. 12, Dec. 1990, pp. 21-30.

*Primary Examiner* — Raul J Rios Russo
(74) *Attorney, Agent, or Firm* — Reinhart Boerner Van Deuren P.C.

(57) ABSTRACT

The application relates to a measuring device for a casing of a deep boring, including at least one electrical measuring cable insertable into the casing and having a first cable end connectable to at least one measuring equipment of the measuring device and a further cable end, at least one measuring head arranged on the further cable end and having at least one electrically conductive connecting element having a contact end configured to contact an inner wall of the casing, and at least one ground contact element connectable to the measuring equipment. The measuring equipment is configured to measure at least one electrical parameter dependent on at least one electrical protection parameter applied to the casing.

20 Claims, 6 Drawing Sheets

(51) Int. Cl.
*B60L 53/66* (2019.01)
*C23F 13/04* (2006.01)
*E21B 41/02* (2006.01)
*E21B 47/00* (2012.01)
*F16L 101/30* (2006.01)
*G01M 3/40* (2006.01)
*G01N 17/00* (2006.01)
*G01N 27/04* (2006.01)

(52) U.S. Cl.
CPC ........... *E21B 47/00* (2013.01); *G01N 17/006* (2013.01); *C23F 13/04* (2013.01); *F16L 2101/30* (2013.01); *G01M 3/40* (2013.01); *G01N 27/041* (2013.01)

(58) Field of Classification Search
CPC ....... F16L 2101/30; G01M 3/40; C23F 13/04; B60L 53/62; B60L 53/665
USPC ......................................................... 324/323
See application file for complete search history.

(56) References Cited

U.S. PATENT DOCUMENTS

2015/0330172 A1* 11/2015 Allmaras ................ E21B 23/14
166/250.01
2020/0003051 A1* 1/2020 Ludwig ................... E21B 34/06

FOREIGN PATENT DOCUMENTS

| DE | 1583837 C | 8/1971 |
| EP | 0235478 B1 | 11/1993 |
| JP | H0718929 B2 | 3/1995 |

* cited by examiner

MEASURING DEVICE FOR A CASING OF A DEEP BORING

CROSS-REFERENCE TO RELATED PATENT APPLICATIONS

This patent application is a continuation of International Application No. PCT/EP2022/061658, filed on May 2, 2022, and which claims the benefit of priority to German Patent Application No. 10 2021 113 965.1, filed May 31, 2021, the entire teachings and disclosures of the aforementioned applications are incorporated herein by reference thereto.

FILED OF THE DISCLOSURE

The application relates to a measuring device for a casing of a deep boring. Furthermore, the application relates to a measuring set, a measuring vehicle, a measuring method and a measuring system.

BACKGROUND OF THE INVENTION

In deep borings, the borehole is lined with a so-called casing. Deep borings are used, for example, to extract fossil hydrocarbons, in particular natural gas or crude oil. Increasingly, deep borings are also used in the operation of underground storages, compaction plants or geothermal energy plants.

In a deep boring, it must be ensured that no leakage occurs in the casing during operation, in particular to prevent the fluid conveyed by the casing from escaping from the casing into the environment.

The at least one pipe element of a casing is generally made of metal, in particular steel. By corrosion a damage of a pipe element can be caused during operation resulting in a leakage. Different corrosion protection measures are known from the prior art.

In principle, the corrosion protection measures can be divided into passive corrosion protection measures and active corrosion protection measures. An exemplary passive corrosion protection measure is the provision of a corrosion protection coating, in particular made of a suitable corrosion protection material—suitable corrosion protection materials are known in principle.

A problem with a casing of a deep boring of regularly more than 500 m depth (e.g., between 500 m and 5000 m) is that the application of a passive corrosion protection measure does not ensure that it is actually intact during the entire operating time of the casing. For example, a damage to a corrosion protection coating may occur during manufacture of the pipe elements of the casing, during installation of the casing and/or during operation.

Since such a damage is not detectable, in the prior art an active corrosion protection measure is applied to a casing of a deep boring (instead of a passive corrosion protection coating).

In particular, the so-called cathodic corrosion protection (CCP) is used. In this case, at least one electrode is arranged in the ground adjacent to the casing as an external current anode. Furthermore, a (CCP) protection device with a transformer, in particular in the form of a controllable DC transformer (e.g., current and/or voltage transformer), is provided.

During the operation of the casing, an electrical protection parameter (preferably a protection voltage and/or a protection current) is applied, in particular permanently, to the casing (and the at least one electrode) by the at least one transformer of the (CCP) protection device so that the casing, the at least one electrode, the transformer and the ground form an electric circuit. This can prevent corrosion from occurring on the casing in a known manner.

In order to ensure sufficient corrosion protection, the applied protection voltage and the applied protection current, respectively, must be sufficiently large. Since there is no way in the prior art to determine whether the selected protection current value and/or the selected protection voltage value is/are actually sufficiently high respectively large enough to ensure effective corrosion protection, protection voltage values with a very high error tolerance are always used in practice.

The disadvantage of this is that the protection parameter value of the at least one electrical protection parameter is usually significantly higher than it would actually be required. This leads to an increased energy consumption during the operation of the casing and, consequently, to considerable and at least partially unnecessary operating costs without actually improving the protection against leakage of the casing.

However, the even bigger problem in practice occurs when the selected protection parameter value of the at least one electrical protection parameter is not sufficiently large and therefore no sufficient corrosion protection is provided by the applied protection parameter. In this case, corrosion can occur at the casing and thus a leakage (in particular in a lower part) of the casing.

Due to the leakage, for example, a large amount of crude oil can penetrate the soil unnoticed in the case of a casing in the form of production casing for the extraction of crude oil. This results in a considerable environmental damage since the leakage is often only detected after a long period of time. The elimination of such environmental damage—if at all possible—is associated with considerable costs.

SUMMARY OF THE INVENTION

Therefore, the object of the present application is to provide a possibility which enables a detection of a sufficient corrosion protection at a casing of a deep boring, in particular in a simple manner.

The object is solved according to a first aspect of the application by a measuring device according to the present disclosure for a casing of a deep boring, in particular for a production casing of a deep boring. The measuring device comprises at least one electrical measuring cable insertable into the casing and having a first cable end connectable to at least one measuring equipment of the measuring device and a further cable end. The measuring device comprises at least one measuring head arranged at the further cable end and having at least one electrically conductive connecting element. The electrically conductive connecting element comprises a contact end configured to contact an inner wall of the casing. The measuring device comprises at least one ground contact element connectable to the measuring device. The measuring equipment is configured to measure at least one electrical measuring parameter depending on at least one electrical protection parameter applied to the casing.

In contrast to the prior art, according to the application a possibility for detecting sufficient corrosion protection for a casing of a deep boring is provided by providing a measuring possibility for verifying the (active) corrosion protection of a casing. It has been recognized that a measuring cable with a measuring head, which can be inserted into the casing at least almost up to the end of the casing and which makes it possible to establish an electrical connection between the inner wall of the casing and the measuring head and measuring cable, respectively, (only) at this measuring depth, i.e. at this specific measuring position and measuring point, respectively, makes it possible to verify the corrosion protection. In a particularly simple manner, sufficient corrosion protection can be verified based on this measurement.

The measuring device according to the application is an electrical measuring instrument. The electrical measuring instrument serves to determine whether an installed casing of a deep boring has sufficient (active) corrosion protection.

In the present context, a deep boring means in particular a boring with a depth of at least 100 m, preferably of at least 500 m (and e.g., at most 5000 m).

As has already been described, deep borings are used, for example, for the production of fossil hydrocarbons, in particular for the production of natural gas or crude oil. Increasingly, deep borings are also used in an operation of underground storages, in compaction plants or geothermal energy plants.

A borehole of a deep boring is usually provided, in particular lined, with a so-called casing. In the present case, the casing and pipe string, respectively, means in particular the pipe section with which the borehole is lined. The task of the casing is in particular to stabilize the borehole in the long term and to seal it off from the surrounding soil and surrounding rock, respectively.

A casing (respectively the boring equipped with it) can in particular comprise a plurality of pipe elements. Preferably, as the pipe elements a plurality of telescopic-concentrically interlocking pipes can be provided. The pipe diameter (in particular at least the inner pipe diameter) may be reduced by internals (e.g., landing nipples, etc.).

For example, a casing may have at least one pipe element selected from the group comprising:
standpipe respectively conductor casing,
surface casing respectively anchor casing,
technical casing respectively intermediate casing, and
conveyor casing respectively end casing respectively production casing.

Preferably, a casing may comprise all of said pipe elements. It shall be understood that further pipe elements or other pipe elements may be provided.

In particular, a pipe element may comprise a cylindrical shape with a circular cross-section. It shall be understood that other shapes may be provided.

A pipe element may generally be made of a metal, preferably steel.

The measuring device comprises at least one measuring cable having two cable ends. The first cable end may be electrically connected, in particular fixedly and permanently, respectively, with a measuring equipment of the measuring device. According to the application, a measuring head is provided at the further cable end respectively the other cable end. The measuring head comprises at least one electrically conductive connecting element. Preferably, the measuring head can comprise a plurality of electrically conductive connecting elements.

Preferably, the measuring head may comprise a spherical shape. Also, a cylindrical shape may be provided. It shall be understood that other shapes are also conceivable, such as a cuboid shape.

The outer (maximum) diameter of the measuring head (without taking into account the at least one connecting element) may be at least smaller than the inner diameter of the casing (at least at the specific measuring point within the casing).

In particular, the electrically conductive connecting element comprises a free contact end configured to (electrically) contact an inner wall of the casing, preferably at at least one specific measuring depth within the casing. In particular, the contacting can be done in such a way that an electrical connection between the connecting element and the inner wall is established for performing a measurement.

Such a connecting element may in particular be an elongated body, for example a wire element. Preferably, a connection element according to the application may be a thin (e.g., between 1 mm and 50 mm) metal element, in particular a thin and long (e.g., between 1 cm and 1 m) shaped and flexible metal element with preferably circular and/or oval cross-section. Other cross-sectional shapes may comprise flat wire elements, square wire elements or profiled wire elements.

One end of the connecting element may be electrically (fixedly) connected to the measuring cable, in particular to at least one measuring line of the measuring cable. The free contact end may extend outwardly, as viewed from a surface of the measuring head. In an inserted state, i.e., when the measuring head is inside the casing, the free contact end may extend, as seen from the surface of the measuring head, substantially in the direction of the inner wall of the casing.

In particular, the measuring head according to the application enables an establishing of an electrical connection between the measuring cable (in particular the measuring line) and the (metallic) inner wall of the casing (at least at a specific measuring point within the casing).

Furthermore, the measuring equipment may be electrically connected, in particular fixedly and permanently, respectively, to the at least one ground contact element. A ground contact element may be in electrical contact with the earth at least during the measurement. In particular, the at least one ground contact element may be arranged on the ground adjacent to the casing and/or at least partially inserted in the ground at least during the measurement.

In particular, the measuring equipment may be an electrical measuring equipment. For example, the measuring equipment may comprise an ammeter and/or a voltmeter.

In particular, the measuring equipment may be configured to measure at least one electrical parameter, preferably at the first contact end of the measuring cable and at the at least one electrical ground contact element. Preferably, the electrical parameter may be a measurement voltage, such as a measurement voltage present between the first contact end of the measuring cable and the at least one electrical ground contact element and/or a measurement current flowing between the first contact end of the measuring cable and the at least one electrical ground contact element. Preferably, both voltage and current can be measured.

The at least one electrical measuring parameter (e.g., measurement voltage and/or measurement current) results from at least one electrical protection parameter (e.g., protection current and/or protection voltage) applied to the casing. In particular, a (CCP) protection device may be provided with a (protection parameter) transformer, preferably in the form of a DC transformer (e.g., current transformer and/or voltage transformer). During the measuring process (and in particular during the operation of the casing, as described), an electrical protection parameter (preferably a protection voltage and/or a protection current) can be applied to the casing (and the at least one electrode) by the at least one transformer of the (CCP) protection device.

According to one embodiment of the measuring device according to the application, the (free) contact end of the at least one connecting element can be configured to contact the inner wall of the casing at at least one specific measuring depth in such a way that an electrically conductive connection is established between the inner wall at the specific measuring depth and the contact end of the connecting element and thus the further end of the measuring cable, in particular the at least one electrical measuring line of the measuring cable.

According to a further embodiment of the measuring device according to the application, the measuring device may comprise at least one evaluation equipment. The evaluation equipment may be configured to determine a sufficient corrosion protection based on the at least one measured electrical parameter and at least one specific corrosion protection criterion. In particular, the evaluation equipment can be communicatively connectable to the measuring equipment. The measuring equipment can provide the at least one measured measuring parameter value of the at least one measuring parameter to the evaluation equipment.

If, for example, the (specified) corrosion protection criterion is satisfied by the at least one measured value of the at least one measuring parameter (i.e., the evaluation result is positive), it can be determined that there is sufficient (active) corrosion protection. In other words, sufficient corrosion protection can be demonstrated in this case.

If, for example, the (specified) corrosion protection criterion is not met by the at least one measured value of the at least one measuring parameter (i.e., the evaluation result is negative), it can be determined that there is no sufficient (active) corrosion protection. In other words, in this case, sufficient corrosion protection cannot be demonstrated.

For example, the corrosion protection criterion can define a permissible parameter value range (e.g., defined by at least one limit value, preferably an upper limit value and a lower limit value, particularly preferably the range of about $-0.85$ $V_{cse}$ to $-1.2$ $V_{cse}$ (CSE stands in particular for copper-copper sulfate electrode and Cu—CuSO4, respectively). For example, the corrosion protection criterion may define a permissible voltage value range (e.g., about $-0.65$ $V_{cse}$ to $-1.2$ $V_{cse}$) and/or a permissible current value range.

Then, for example, it can be verified whether or not the at least one measured value (or, for example, the resistance value determined from measured current and voltage) of the at least one measuring parameter is within the respective permissible measuring parameter value range. If the measured value is within the measuring parameter value range (the corrosion protection criterion is fulfilled in this case), it can be determined that there is sufficient (active) corrosion protection. If the measured value is outside the measuring parameter value range (the corrosion protection criterion is not fulfilled in this case), it can be determined that sufficient (active) corrosion protection is not present. In a simple and safe way, it can be verified and determined whether sufficient (active) corrosion protection is present (or not).

According to a preferred embodiment of the measuring device according to the application, the measuring device may comprise at least one protection parameter setting equipment configured to set the at least one electrical protection parameter based on the evaluation result. The protection parameter setting equipment may in particular be communicatively connectable to the evaluation equipment. The evaluation equipment can provide the evaluation result to the protection parameter setting equipment. In particular, the evaluation result can be provided at least if the corrosion protection criterion is not met.

The protection parameter setting equipment can comprise at least one communication module that can be communicatively connected to the (described) protection device (for example, via a wireless and/or wired communication link). The protection parameter setting equipment can be configured to change the at least one value of the at least one protection parameter, i.e., in particular to increase or reduce it as a function of the evaluation result.

In particular, this can be performed in such a way that the at least one protection parameter value is changed in such a way that the corrosion protection criterion is met. For example, the at least one protection parameter value of the protection parameter can be changed until the (continuously or at predefinable time intervals (for example, always after a change has been made to the protection parameter value of the protection parameter) measured value of the at least one measuring parameter satisfies the corrosion protection criterion. A change may be continuous or discrete. For example, the generated protection current value can be increased such that the measured value of the at least one measuring parameter satisfies the corrosion protection criterion.

As has been described, the corrosion protection criterion may comprise at least one permissible measuring parameter value range. Alternatively or additionally, the corrosion protection criterion may comprise a permissible optimized measuring parameter value range (also referred to as optimum value range). The optimum value range (this can depend in particular on the environmental variables present at the installation site, such as soil conditions, structure of the casing, conductivity of the pipe base contacts, etc.) can in particular be contained in the permissible measuring parameter value range. In particular, the optimum value range specifies the parameter value range (for example, a value range $-0.65$ $V_{cse}$ to $-1.2$ $V_{cse}$) at which sufficient corrosion protection is ensured and, at the same time, the value of the at least one electrical protection parameter is not significantly higher than is actually required. In particular, an additional optimization of the energy consumption of the at least one protection device takes place.

Preferably, the protection parameter setting equipment can adapt the at least one protection parameter value of the at least one electrical protection parameter in such a way that the optimum value range is fulfilled, i.e., the measured value lies within the optimum value range.

In particular, the evaluation result can contain a first information about the distance to the optimum value range and a second information about whether the measured value is below the optimum value range or above the optimum value range. In one case, the protection parameter setting equipment may be part of the evaluation equipment and, depending on the at least one optimum value range and the at least one measured value, cause an adjusting of the at least one protection parameter value.

By way of example, the optimum value range will be explained with reference to a voltage value range.

If the measured voltage is less than the optimum value range (i.e., less than a lower voltage limit value, for example), the protection parameter value may be increased until the measured voltage is within the optimum value range (i.e., less than an upper voltage limit value and greater than a lower voltage limit value, for example).

If the measured voltage is greater than the optimum value range (i.e., greater than an upper voltage limit value, for example), the protection parameter value can be reduced until the measured voltage is within the optimum value range (i.e., less than an upper voltage limit value and greater than a lower voltage limit value, for example).

In a corresponding manner, an adjustment can be made at further or other optimum value ranges. Moreover, these embodiments can be applied to a permissible measuring parameter value range.

According to a further embodiment of the measuring device according to the application, the length of the measuring cable can correspond to at least 70% of the length of the casing, preferably at least 90% of the length of the casing, particularly preferably at least 100% of the length of the casing (and, for example, at most 200%, preferably at most 125%). Hereby, the measurement can be performed at a measuring point located in the lower third of the installed casing, preferably in a lower quarter of the installed casing, particularly preferably in a lower fifth.

Furthermore, according to a further embodiment of the measuring device according to the application, the at least one measuring cable may comprise at least one electrically conductive measuring line electrically connected to a further end of the at least one connecting element. The measuring line may be surrounded by at least one (electrically non-conductive) insulation sheath. By providing an insulation sheath, it is achieved that no undesired electrical contact can occur between the measuring line and the inner wall.

In order to take in a particularly simple manner the measuring head to a specific measuring point within the casing (in particular in a lower third of the casing), it is proposed according to a further embodiment of the measuring device according to the application that the measuring head can comprise at least one weight element. Alternatively or additionally, the measuring head may comprise at least one fastening element configured to fasten at least one weight element. This enables the selection of the at least one weight element (for example from a plurality of weight elements) depending on the dimensions of the casing to be verified. By the weight element the measuring head can be moved perpendicularly to the measuring point. At the measuring point, the measuring cable can be locked by a locking mechanism. After the measurement, the measuring cable can be retracted again.

According to a further embodiment of the measuring device according to the application, the measuring device may comprise at least one measuring cable winding equipment configured to wind and/or unwind the measuring cable. The at least one measuring cable winding equipment may comprise a cable drum. Preferably, the measuring cable winding equipment may be motor-driven. A measuring cable winding equipment allows an easy storage of the measuring cable in an unused state of the measuring cable. Also, a measuring cable with a measuring head (preferably weighted with a weight element) can be inserted in a simple manner (through a lock in the casing) into the casing by means of a measuring cable winding equipment, i.e., in particular, it can be lowered and raised. The measuring cable winding equipment can in particular comprise a length measuring unit for measuring the length of the unwound part of the measuring cable. This allows the measuring cable respectively the measuring head to be inserted in a precise manner to a specific measuring point at a specific measuring depth in the casing.

According to a preferred embodiment of the measuring device according to the application, the measuring head may comprise a first connecting element extending in a first radial direction and at least a second connecting element extending in a second radial direction. The first radial direction may be a substantially opposite radial direction to the second radial direction.

In particular, a radial direction means a direction starting from an axis running vertically (during measurement) through the center of the measuring head. The connecting elements (at least the respective first end connected to the measuring head (also referred to as the root)) may lie substantially in the same horizontal plane. There may be an angle (in a horizontal plane) of about 180° between the at least two connecting elements. For example, there may be at least four connecting elements whose respective roots lie in substantially the same horizontal plane, and there may be an angle (in a horizontal plane) of about 90° between two adjacent roots (respectively).

In particular, the respective contact ends of the respective connecting elements are located at the respective most distant points from a center point and a center axis, respectively, of the measuring head (as viewed in a radial direction). In one case, the measuring head may be formed by the connecting region of the at least two connecting elements.

According to a particularly preferred embodiment of a measuring device according to the application, the ratio of the (horizontal) contact end distance between the first contact end of the first connecting element and the second contact end (which is substantially opposite to the first contact element) of the second connecting element to the inner diameter (at the at least one specific measuring position within the casing) may be at least greater than 1.001, preferably at least greater than 1.01, particularly preferably 1.1.

The connecting elements may in particular be flexible connecting elements, for example in the form of wires with a cross-sectional diameter between, for example, 1 mm and 50 mm. The length of such a connecting element may in particular depend on the inner diameter in the area of the specific measuring point. This ensures that at least one contact end of the plurality of connecting elements electrically contacts (in a sufficient manner) the inner wall of the casing at the specific measuring point.

Furthermore, according to a further preferred embodiment of the measuring device according to the application, the measuring head with the at least two connecting elements may be formed as a wire brush head. The wire brush head may comprise a plurality (e.g., at least greater than 8, preferably at least greater than 20, particularly preferably at least greater than 50 (and e.g., less than 200)) of connecting elements, particularly wire elements extending radially outward.

A wire element may be formed of metal, for example iron, copper, brass, aluminum, silver, gold, titanium, stainless steel, copper alloys, or the like.

It has further been recognized that the dimensions of various installed casings may differ. In addition to the depth and drilling depth, respectively, of a casing, in particular the respective inner diameters can be different. In order to be able to use the measuring device flexibly for casings of different dimensions, i.e., in particular with different inner diameters, it is proposed according to a preferred embodiment that the measuring head is formed exchangeable.

Preferably, it can be provided that a coupling mechanism is arranged at the further cable end of the measuring cable. The coupling mechanism can be configured to releasable (mechanical and electrical) couple the further cable end to a measuring head. For example, a plug connection (similar to a plug/socket connection) can be provided, which can additionally be latched and/or locked.

The at least one measuring head can in particular be selectable from at least two different measuring heads (preferably with different long connecting elements, i.e., with different (maximum) contact end distances). It should be noted here that a contact end distance may in particular be the maximum outer diameter of the measuring head including the plurality of connecting elements.

A further aspect of the application is a measuring set. The measuring set comprises at least one previously described measuring device. The measuring set comprises at least two different (previously described) measuring heads each configured to releasable couple with a coupling mechanism of the measuring cable. Preferably, at least two, preferably at least five measuring heads may each be provided with a different contact end distance (and/or outer diameter).

According to one embodiment of the measuring set according to the application, the measuring set may comprise at least one weight element (described above), preferably a plurality of weight elements each having a different weight and/or different shape, in particular a different outer diameter.

A further aspect of the application is a measuring vehicle comprising at least one (previously described) measuring device installed on the measuring vehicle. Preferably, the measuring vehicle may comprise a previously described measuring set. The measuring vehicle may be a road vehicle, water vehicle or rail vehicle.

In a still further aspect of the application, a measuring method is provided. In particular, the measuring method can be used to operate a previously described measuring set. The measuring method comprises:
- providing at least one previously described measuring device,
- inserting the measuring cable with the measuring head into the casing to at least one first specific measuring depth (and measuring drilling depth, respectively),
- measuring at least one electrical measuring parameter dependent on at least one electrical protection parameter applied to the casing at the first contact end of the measuring cable and the electrical ground contact element.

The method may comprise a previously described evaluation and, in particular, a previously described adjustment of the at least one protection parameter value. The method may be, at least in part, a computer-implemented method.

According to a preferred embodiment of the measuring method according to the application, the method may comprise:
- generating, by a transformer of a protection device of the (installed) casing, at least one electrical protection parameter, and in particular applying the generated protection parameter to the casing (at least during the measurement process).

A still further aspect of the application is a measuring system comprising a (previously described) protection device and at least one (previously described) measuring device (according to the present disclosure).

A previously described device, equipment (e.g., evaluation equipment, protection parameter setting equipment, etc.), element, etc., may comprise at least in part hardware elements (e.g., processor, memory means, etc.) and/or at least in part software elements (e.g., code executable by a processor).

The features of the measuring devices, measuring sets, measuring systems, measuring vehicles and measuring methods, can be freely combined with each other. In particular, features of the description and/or dependent claims may be independently inventive, even by completely or partially bypassing features of the independent claims, alone or freely combined with each other.

BRIEF DESCRIPTION OF THE DRAWINGS

There are now a multitude of possibilities for designing and further developing the measuring device according to the application, the measuring set according to the application, the measuring vehicle according to the application, the measuring system according to the application and the measuring method according to the application. For this purpose, reference is made on the one hand to the patent claims subordinate to the independent patent claims, and on the other hand to the description of embodiments in connection with the drawing. The drawing shows:

DETAILED DESCRIPTION

In the following, similar reference signs are used for similar elements.

Figure 1:
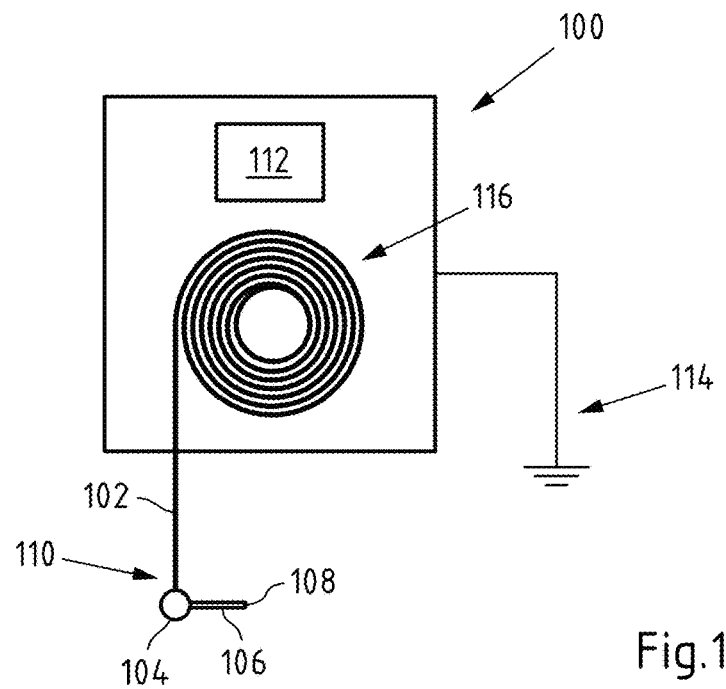
FIG. 1 is a schematic view of an embodiment of a measuring device according to the present application.

FIG. 1 shows a schematic view of an embodiment of a measuring device 100 according to the present application. The measuring device 100 preferably serves to verify a sufficient (active) corrosion protection (preferably CCP), in particular a proof that a sufficient corrosion protection is present at a casing of a deep boring.

The measuring device 100 comprises at least one electrical measuring cable 102 which is insertable into the casing to be verified and comprises a first cable end (this is not shown at present for the sake of a better overview) which can be connected to at least one measuring equipment 112 of the measuring device and a further cable end 110. A measuring head 104 comprising at least one electrically conductive connecting element 106 is arranged at the further cable end 110.

The connecting element 106 is preferably an elongated rod element 106, in particular a wire element 106 made of an electrically conductive material. In the present embodiment, the measuring head 104 may be the connecting region between the measuring cable 102 and the further end of the connecting element 106.

The connecting element 106 comprises at least one (free) contact end 108 configured to contact an inner wall of the casing to be verified.

Furthermore, the measuring device 100 comprises at least one ground contact element 114 electrically connectable to the measuring equipment 112. The ground contact element 114 may be in electrical contact with the ground at least during the measurement process, as described above.

The (electrical) measuring equipment 112 is configured to measure at least one electrical parameter dependent on at least one electrical protection parameter applied to the casing. As previously described, the measuring equipment 112 may comprise a voltage measuring equipment (for measuring a measurement voltage) and/or a current measuring equipment (for measuring a measurement current). Also, a resistance value may be determinable from the measured values by the measuring equipment 112.

Preferably, the measuring device 100 can comprise a (in particular motor-driven) measuring cable winding equipment 116, which is configured to wind and/or unwind the measuring cable 102. In the present example, a cable drum 116 is provided, which enables winding and/or unwinding of the measuring cable 102. A length sensor, which is not shown, of the measuring cable winding equipment 116 can measure the length of the unwound cable portion.

As described above, a measuring device according to the application comprises at least one measuring head with at least one connecting element. Preferred and non-exhaustive embodiments of measuring heads are illustrated in FIGS. 2a to 2d. In order to avoid repetitions, essentially only the differences to the embodiment according to FIG. 1 are described below and otherwise reference is made to the explanations of FIG. 1. In the coordinate system, z denotes the vertical direction and r a radial direction.

Figure 2A:
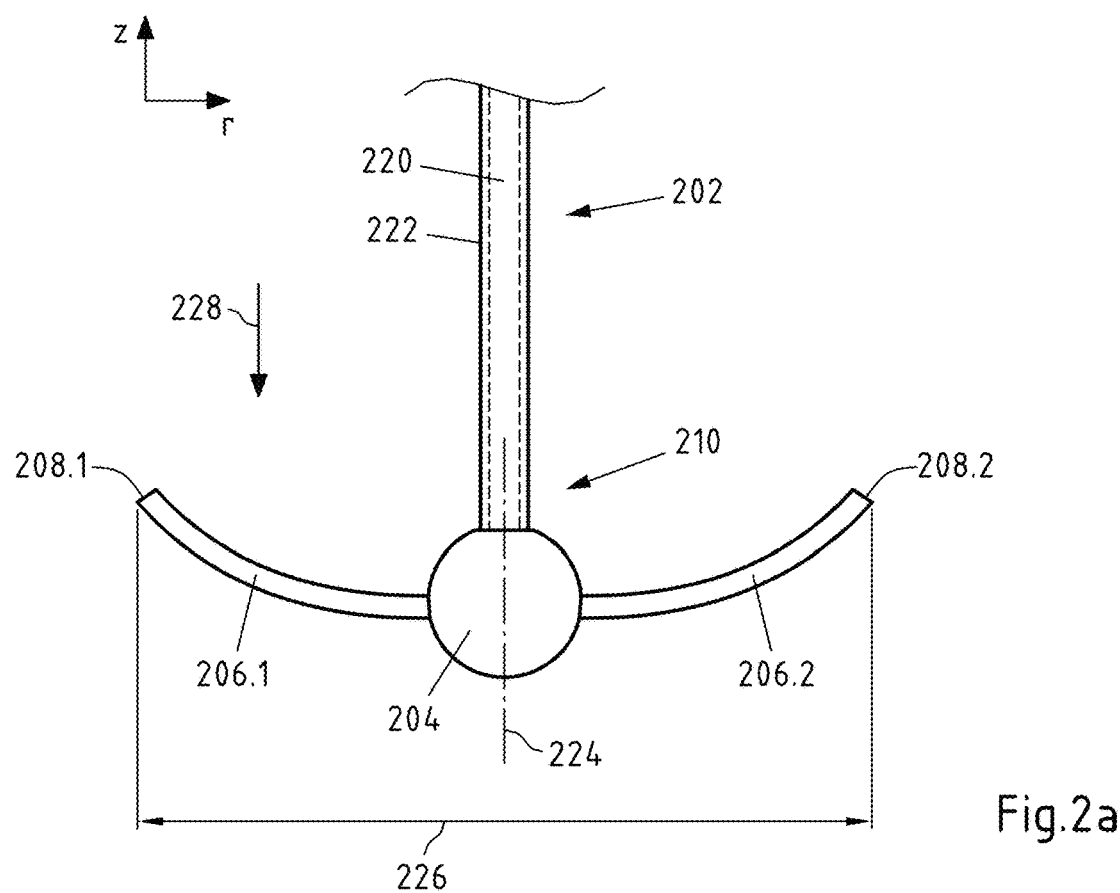
FIGS. 2*a-d* are perspective views of embodiments of measuring heads according to the present application.

FIG. 2a shows a first embodiment of a measuring head 204, which comprises two elongated extension elements 206.1, 206.2. In particular, the measuring head 204 is formed by the connection point and connection region, respectively, of the respective further ends, also called roots, of the extension elements 206.1, 206.2.

Here, the reference sign 224 designates the vertical axis running through the center of the measuring head 204 (formed spherically in the present example).

As can be seen, a first connecting element 206.1 extends in a first radial direction and the at least one second connecting element 206.2 extends in a second radial direction each starting from said vertical axis 224. As can further be seen, the first radial direction is a substantially opposite radial direction to the second radial direction.

In other words, there is presently an angle of about 180° between the extension elements 206.1, 206.2 which lies in a substantially horizontal plane. In particular, the respective contact ends 208.1, 208.2 are located at the respective most distant points from a center point respectively axis 224 of the measuring head 204 (viewed in the radial direction).

The maximum contact end distance 226, in particular extending in a horizontal plane, can be adapted to the inner diameter of the casing at the measuring point in such a way that sufficient contact is established between at least one contact end 208.1, 208.2 and the inner wall (during the measuring process).

Preferably, the ratio of the (horizontal) contact end distance 226 between the first contact end 208.1 of the first connecting element 206.1 and the second contact end 208.2 of the second connecting element 206.2 to the inner diameter (at the at least one specific measuring position within the casing) can be at least greater than 1.001, preferably at least greater than 1.01, particularly preferably 1.1.

The reference sign 228 denotes in the present case the direction of insertion. As can be seen, preferably a contact end 208.1, 208.2 can be bent in the direction of the insertion direction 228. This can facilitate the insertion of the measuring head and at the same time ensure that sufficient electrical contact can be established between the inner wall and the contact end 208.1, 208.2 at the measuring point.

Furthermore, it can be seen from FIG. 2a that the measuring cable 202 can comprise at least one measuring line 220 (made of an electrically conductive material (e.g., copper, aluminum, etc.)) and at least one insulation sheath 222 (made of an electrically non-conductive material (e.g., a suitable plastic)).

The insulation sheath 222 surrounds the at least one measuring line 220. This ensures that no unwanted electrical contact is established between the inner wall and the measuring cable (above the actual measuring point) during the measuring process. It shall be understood that a measuring cable may have other elements (e.g., protective shield, etc.).

It should be noted that a connecting element (in general) may have no insulation sheath or may have an insulation sheath in which at least the free contact end is exposed, i.e., has no insulation sheath.

Figure 2B:
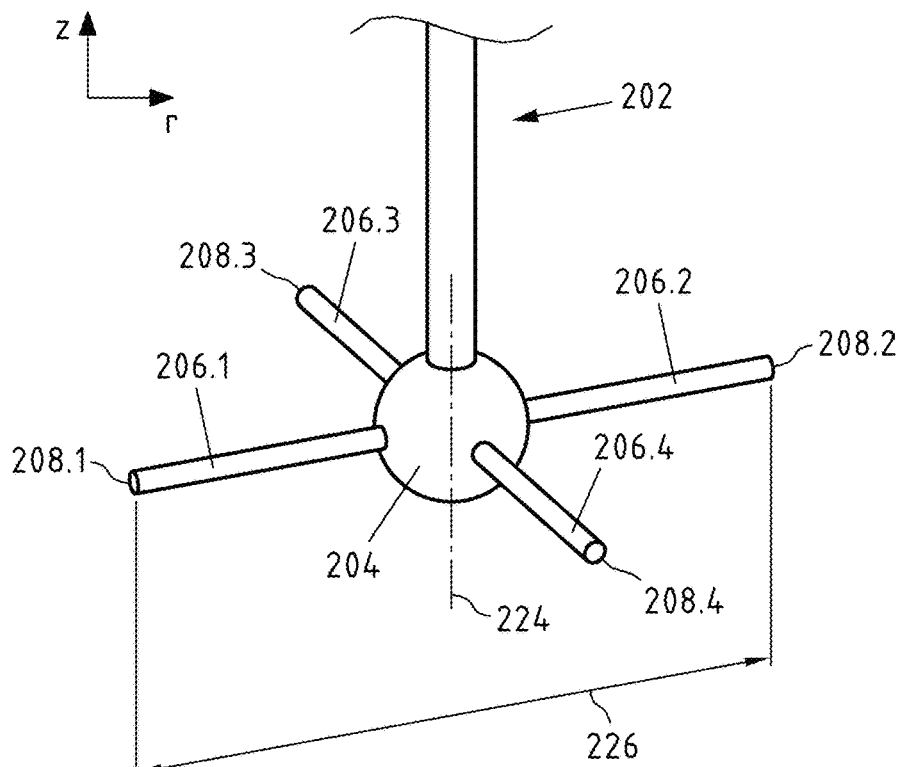

FIG. 2b shows a further embodiment of a measuring head 204. In contrast to the measuring head 204 according to FIG. 2a, the measuring head 204 according to FIG. 2b comprises, by way of example, four electrically conductive connecting elements 206.1 to 206.4, wherein two conductive connecting elements 206.1 to 206.4 each extend in opposite radial directions.

As can be seen from FIG. 2b, respective roots may lie in substantially the same horizontal plane, and there may be an angle (in a horizontal plane) of about 90° between two adjacent roots (respectively). This can ensure in an even more secure manner that sufficient electrical contact is established at the specific measuring point.

Figure 2C:
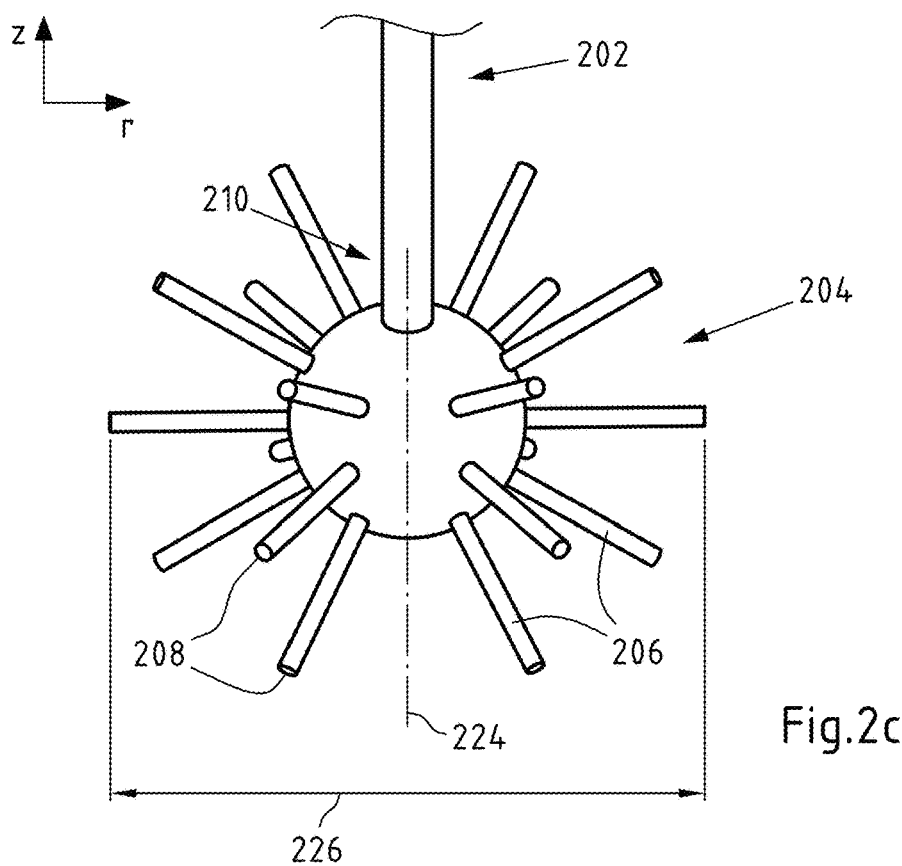

FIG. 2c shows a further embodiment of a measuring head 204. The measuring head 204 of FIG. 2c is formed in particular as a wire brush head 204, in particular with a plurality (at least >5, preferably at least >10) of radially outwardly extending wire elements 206 as connecting elements 208.

The maximum contact end distance 226 (extending in a horizontal plane) of two contact ends 208 of two connecting elements 206 extending substantially in opposite radial directions may also be referred to as the maximum diameter of the measuring head 204. The measuring head 204 as shown in FIG. 2c may have an integrated (not shown) weight element.

Figure 2D:
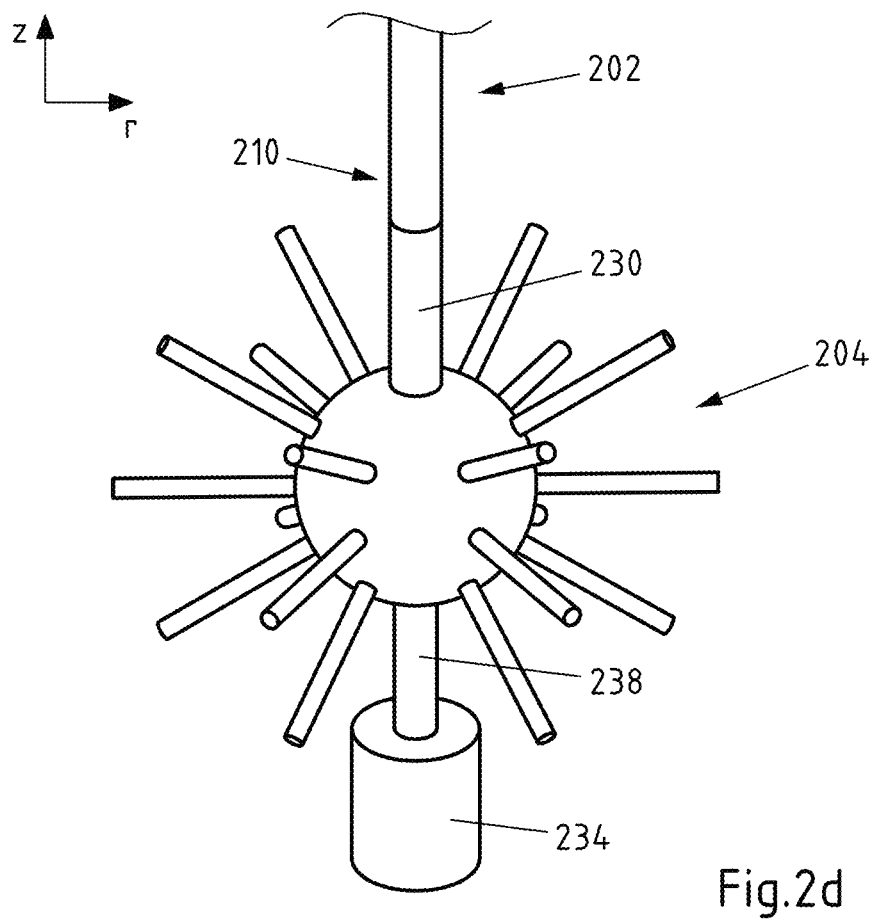

In difference to the embodiment according to FIG. 2c, in the embodiment according to FIG. 2d, a measuring head 204 is shown comprising a (releasable or non-releasable) fastening element 238 (e.g., a snap hook, etc.) which is configured to fasten at least one weight element 234 to the measuring head 204.

Furthermore, a coupling mechanism 230 is presently arranged at the further cable end 210 of the measuring cable 202, for example a latchable connector. In particular, the coupling mechanism 230 is configured to releasably couple the further cable end 210 of the measuring cable 202 to a measuring head 204. In other words, the measuring cable 202 can be equipped with different measuring heads 204, in particular depending on the casing to be verified. The at least one measuring head 204 may in particular be selectable from at least two different measuring heads 204 of a measuring set according to the application.

It shall be understood that the various embodiments of FIGS. 1 to 2d may be combined with each other. For example, the measuring head 104, 204 according to FIG. 1, 2a or 2b can be couplable to a weight element according to FIG. 2d, i.e., have a corresponding fastening element. Also, the measuring head 104, 204 according to FIG. 1, 2a, 2b or 2c may be replaceable according to FIG. 2d.

It should also be noted that a measuring head may also have other shapes and may, for example, be formed in a cylindrical shape, a cuboid shape or the like.

Figure 3:
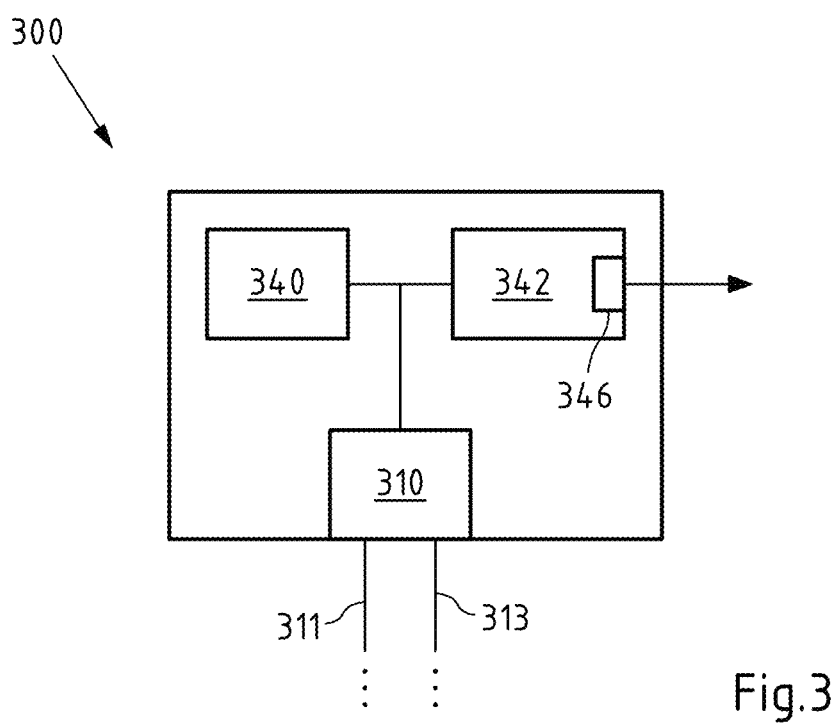
FIG. 3 is a schematic view of a further embodiment of a measuring device according to the present application.

FIG. 3 shows a further embodiment of a measuring device 300 according to the present application. However, for the sake of clarity, a measuring cable and the ground contact element have not been shown (only the first cable end 311 of the measuring cable and the connection end 313 of the ground contact element are shown). In order to avoid repetitions, substantially only the differences to the previous embodiments are explained below.

The measuring device 300 comprises a measuring equipment 310, an evaluation equipment 340 and a protection parameter setting equipment 342 with a communication module 346. Said equipment items 310, 340, 342 may be formed at least partially as software modules executable by a computer and its processor, respectively.

The measuring equipment 310 is electrically connected to the first cable end 311 of the measuring cable and the ground contact element.

Figure 6:
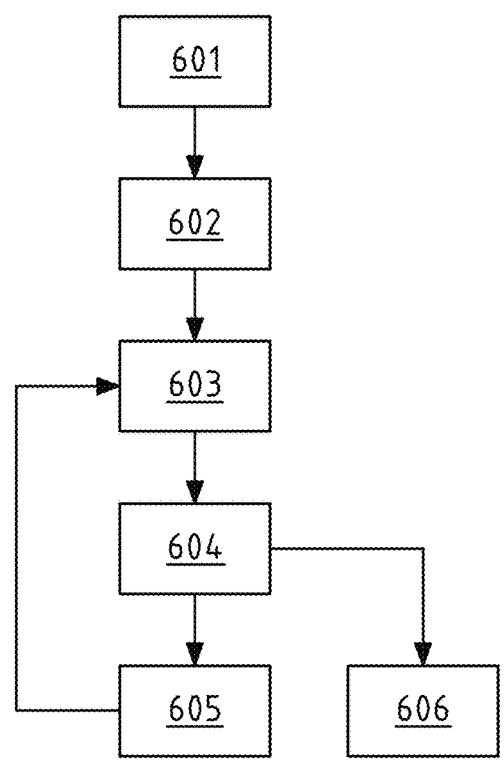
FIG. 6 is a diagram of an embodiment of a measuring method according to the present application.

The operation of the measuring equipment 310 is explained by way of example with the aid of FIG. 6. FIG. 6 shows a diagram of an embodiment of a measuring method according to the present application.

In a first step 601, a providing of at least one measuring equipment 310 is performed. In particular, a providing of the measuring device 300 is performed at the installation location of the casing to be verified. If a measuring vehicle comprises the measurement equipment 310, the providing may comprise driving to the installation location of the casing to be verified.

In a step 602, inserting the measuring cable with the measuring head into the casing to at least a first specific measuring depth respectively a specific measuring point, that is, until the measuring head has reached the desired measuring point. Preferably, the measuring cable can be unwound to a specific measuring depth respectively up to a specific measuring point by a measuring cable winding equipment (cf. e.g., the explanations to FIG. 1). In particular, this means that the measuring head of the measuring cable is located at the specific measuring point within the casing of the deep boring.

In step 603, a measuring is performed, by the measuring equipment 310, of at least one of at least one electrical measuring parameter that depends on an electrical protection parameter applied to the casing. As illustrated, the measuring may be performed at the first contact end 311 of the measuring cable and the connection end 313 of the electrical ground contact element. As has been described, a measurement voltage and/or a measurement current may be measured.

In the step 603, preferably a generating, by a transformer of a (CCP) protection device of the installed casing, of at least one electrical protection parameter (e.g., a protection current and/or a protection voltage) can be performed, and in particular an applying of the generated protection parameter to the casing (at least during the measuring process).

Preferably, in the step 604, an evaluating of the at least one measured value of the at least one measuring parameter is performed and, in particular, in step 605, an adjusting of the at least one electrical protection parameter is performed based on the evaluation result of the step 604.

In the following, by way of example the evaluation is based on a (predetermined) corrosion protection criterion, which comprises at least one permissible optimized measuring parameter value range. An optimized measuring parameter value range differs from a (normal) permissible measuring parameter value range in particular in that it not only specifies the range in which sufficient corrosion protection (in particular sufficient CCP protection) is ensured—as is the case with a (normal) measuring parameter value range—but also additionally specifies the range which corresponds to a value of the at least one electrical protection parameter which is actually required. The difference can be shown in particular by the fact that in the case of a permissible (normal) measuring parameter value range there is only one (e.g., lower) limit value and the measuring parameter value range is otherwise open, whereas in the case of a permissible optimized measuring parameter value range there is a lower limit value and an upper limit value.

In step 604, in particular, a determining is performed, by the evaluation equipment 340, of sufficient corrosion protection based on the at least one measured electrical parameter and at least one specific corrosion protection criterion. If, by way of example, a measured voltage and the described permissible optimized measuring parameter value range in the form of a voltage measurement range defined by an upper voltage limit value (e.g., between 5 and 20 V) and a lower voltage limit value (e.g., between 0.1 V and 4 V) are assumed, a verifying is carried out by the evaluation equipment, in particular, as to whether or not the at least one measured voltage value of the measurement voltage lies in the said range.

If this is the case, it can be determined that the corrosion protection criterion is fulfilled and thus sufficient corrosion protection is present. Then, the measurement process and the measuring method can be terminated in step 606.

If it is determined that the corrosion protection criterion is not fulfilled, it is possible in particular to continue with step 605. It shall be understood that in variants of the invention this step can also be omitted.

In particular, in step 605 an adjusting of the at least one electrical protection parameter, i.e., in particular of the corresponding protection parameter value, is performed. In particular, the at least one protection parameter value (generated by a transformer) can be adjusted such that the measuring parameter value measured in step 603 satisfies the corrosion protection criterion in step 604. By way of example, a protection current is assumed in the following.

Preferably, when a deviation of the measured voltage value from the upper limit value or lower voltage limit value is detected, this deviation information can be forwarded from the evaluation equipment 340 to the protection parameter setting equipment 342 as an evaluation result.

If the at least one measured voltage value is below the lower voltage limit value, for example, the protection current value may be increased (for example, by a predetermined value). Then, with step 303, the method can be continued. If the now measured voltage value is in the mentioned range, the method can be terminated with step 606. Otherwise, the protection current value can be increased again (for example, again by a predetermined value). This may be continued until the corrosion protection criterion is met.

If the at least one measured voltage value is above the upper voltage limit value, for example, the protection current value can be reduced (for example by a predetermined value). Then with step 303 the method can be continued. If the voltage value now measured is within the said range, the method can be terminated with step 606. Otherwise, the protection current value can be reduced again (for example, again by a predetermined value). This can be continued until the corrosion protection criterion is met.

In order to cause an adjusting, in particular an adapting, of the protection current value, a corresponding communication can be performed with the (CCP) protection device by means of the communication module 346.

It shall be understood that the explanations regarding FIGS. 3 and 6 can be transferred to other corrosion protection criteria (e.g., other permissible (and optimized) measuring parameter value ranges), other protection parameters and/or other measuring parameters. It shall be further understood that the steps (e.g., steps 603 to 605) may be performed at least partially in parallel. In particular, it shall be understood that the value of the at least one protection parameter can be changed almost continuously and a measuring and evaluating of the measured value can be performed (almost) simultaneously.

Preferably, the measuring procedure respectively the measuring method can be carried out at at least two different measuring points (in particular at different depths).

Figure 4A:
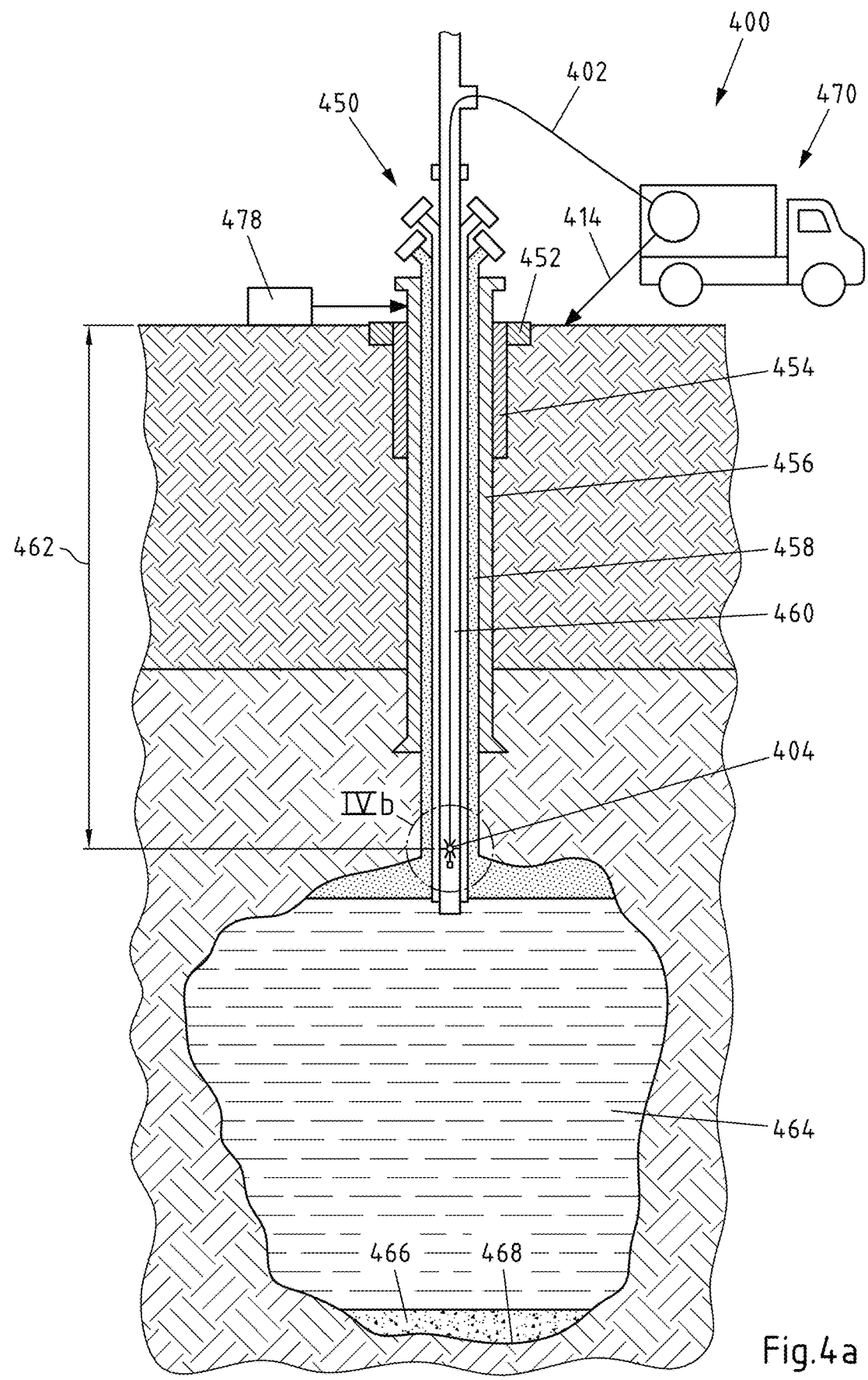
FIGS. 4*a* and 4*b* are perspective views of an embodiment of a measuring device according to the present application during a measuring process and the execution of a measuring method, respectively.
Figure 4B:
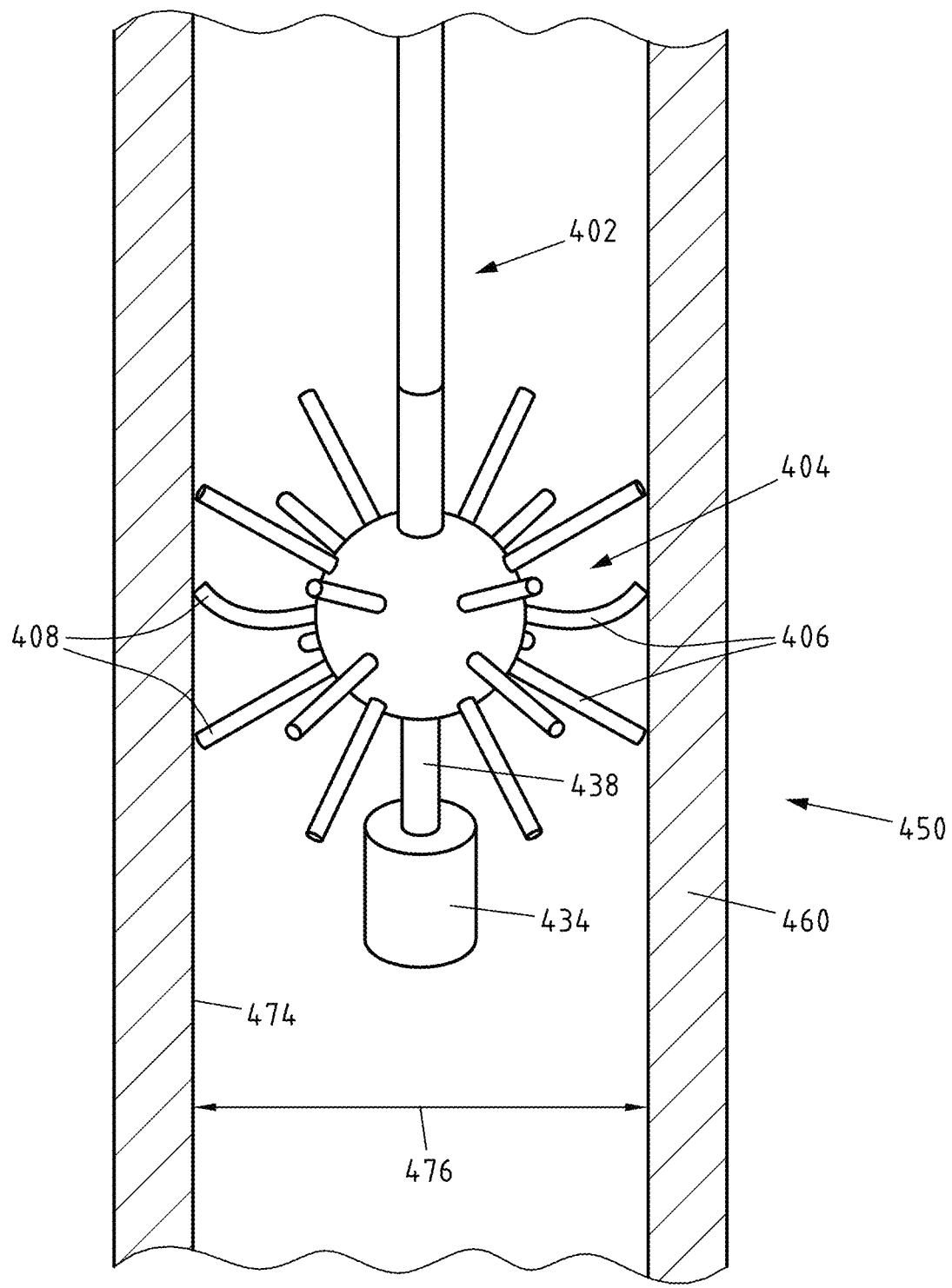

FIG. 4 shows a schematic view of an embodiment of a measuring device 400 during a measuring process, i.e., in particular during an execution of the measuring method according to FIG. 6, for example. In order to avoid repetitions, in the following essentially only the differences to the previous embodiment examples are described. Furthermore, only for the sake of a better overview, the representation of a measuring device, an optional evaluation equipment and an optional protection parameter setting equipment has been omitted.

As can first be seen from the figure, a borehole (e.g., with a depth between 500 m and 5000 m) is lined with a casing 450. The task of the casing 450 is, in particular, to stabilize the borehole in the long term and to seal it against the surrounding rock.

The casing 450 comprises in particular a plurality of pipe elements 452 to 460. As shown, a plurality of telescopic-concentrically interlockable metal pipes 452 to 460 are provided as pipe elements 452 to 460. The pipe diameter (in particular, at least the inner pipe diameter 476) may decrease with increasing depth.

In the present embodiment, the casing 450 comprises a standpipe 452, an anchor casing 454, a technical casing 456, a protection run 458, and a production run 460 respectively a production casing 460.

In particular, a pipe element 452 to 460 may have a cylindrical shape with a circular cross-section. It shall be understood that other shapes may be provided. A pipe element 452 to 460 may preferably be formed of steel.

For example, the casing 450 may be used to produce crude oil 464. As has been described, a casing may also be used in other applications. Reference sign 466 denote the so-called sump, and reference sign 468 denotes the final depth.

In particular, a measuring system is shown in the present embodiment. The measuring system comprises at least the measuring device 400 and at least one protection device 478. The protection device 478 may in particular be a CCP protection device 478.

The protection device 478 may preferably comprise a controllable transformer configured to generate at least one electrical protection parameter (e.g., a protection voltage and/or protection current). The at least one electrical protection parameter may be applied to the casing 450 by the protection device 478. In particular, the transformer may be controlled by a communication module of the measurement device to set the at least one protection parameter value, as previously described.

As has been described, the protection device 478 may comprise at least one electrode (not shown herein) as an external current anode in the ground.

Presently, a measuring vehicle 470 is provided in the form of a measuring car 470. The measuring vehicle 470 may in particular comprise at least the measuring device 400, preferably a measuring set. As can be seen, a ground contact element 414 and a measuring cable 402 are provided. The measuring cable 402 is shown in an inserted state. In particular, the measuring cable 402 can be inserted with the measuring head 404 via a lock into the casing 450.

The measuring head 404 can be lowered into the casing, in particular by means of a measuring cable winding equipment, up to a certain (predetermined) measuring point, as has already been described. The reference sign 462 denotes the measuring depth and measuring drilling depth, respectively. As can be seen, the measuring head 404 is presently located in a lower fifth of the casing 450.

As can be seen in the enlarged section of FIG. 4, the measuring head 404 is in particular a wire brush measuring head 404 with a plurality of wire elements 406. At least one contact end 408 of a connecting element 406 contacts the inner wall 474 of the casing 450, thereby establishing an electrical connection between the inner wall 474 (at the measuring point) and the measuring cable 402 (and thus the measuring device). Presently, a plurality of contact ends 408 of a corresponding plurality of connection elements 406 contact the inner wall 474. This improves said electrical connection and ensures with a higher degree of certainty that a sufficient electrical contact is establishable.

In particular, a sufficient electrical contact can be achieved by selecting a specific measuring head 404 whose contact end diameter respectively diameter is substantially equal to the inner diameter 476 of the casing 450 to be verified (at the measuring point). In particular, the measuring head 404 can be selected such that the ratio of the contact end distance between the first contact end of the first connecting element 406 and the second contact end of the second connecting element 406 to the inner diameter 476 is at least greater than 1.001, preferably at least greater than 1.01, particularly preferably 1.1 (and in particular is less than 1.5, preferably less than 1.3).

Figure 5:
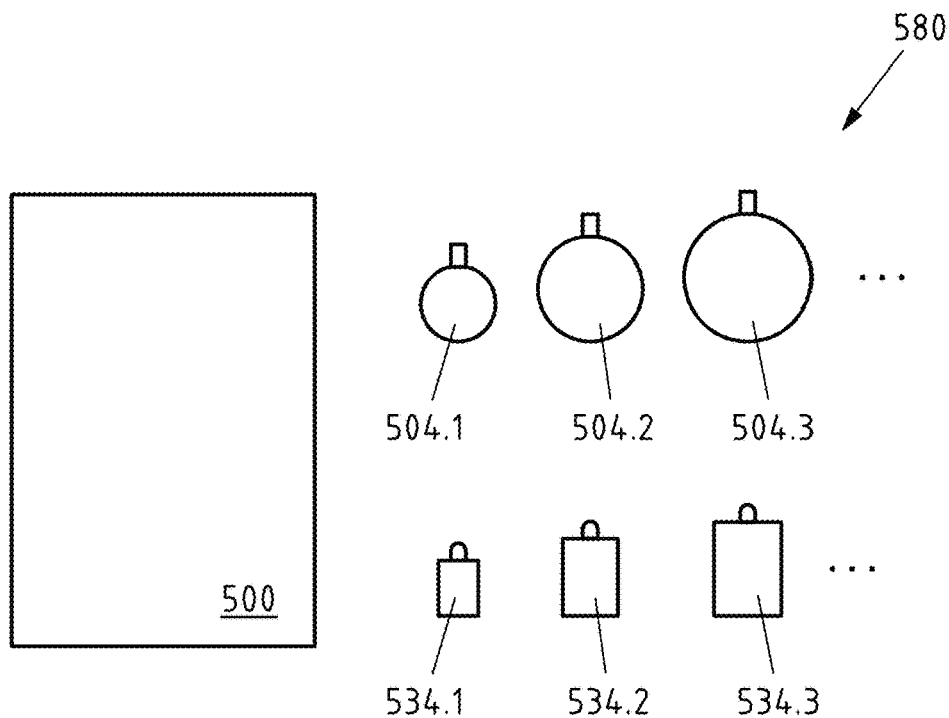
FIG. 5 is a schematic view of an embodiment of a measuring set according to the present application.

FIG. 5 shows a schematic view of an embodiment of a measuring set 580 according to the present application. In order to avoid repetitions, essentially only the differences to the previous embodiments are also described herein.

The measuring set 580 comprises a measuring device 500 (previously described and not shown in detail herein for the sake of a better overview) and a plurality of measuring heads 504.1 to 504.3, in particular each having a different contact end diameter and contact end distance, respectively.

Optionally, the measuring set 500 may comprise a plurality of weight elements 534.1 to 534.3 in particular having a different weight and/or shape in each case.

Accordingly, by means of the present wire-line method, in particular a wire brush head, which may be weighted with a weight, is lowered on an insulated measuring cable connected to the wire brush via a lock in the production casing. The wire brush head is preferably interchangeable and may be substantially equal in circumference (always) to the diameter of the casing to be measured. This makes it possible that a sufficient electrical contact to the pipe can be established.

After inserting the tool and measuring head, respectively, into the casing, the measuring cable of the wire-line measuring device arranged in the measuring vehicle (in particular service vehicle) can be connected above ground to a DC voltage measuring apparatus and the ground probe (respectively ground contact element). If the protection device is now clocked, i.e., in particular a protection parameter is generated and applied, the protective potential of the casing can be read from the DC voltage measuring device.

Based on the results, the protection device respectively the transformer can now be adjusted so that a sufficient protection current flows into the casing.

The advantages of using the measuring device according to the application are in particular the following:

The legally required protection of the casing of deep borings can be demonstrated.

If there is insufficient corrosion protection, substitute measures can be established for periodic verifying of the integrity of the casing.

Environmental damage due to a rupture of a casing of an oil cavern can be avoided.

Energy consumption can be reduced and costs lowered by being able to optimally adjust the protection current.

All references, including publications, patent applications, and patents cited herein are hereby incorporated by reference to the same extent as if each reference were individually and specifically indicated to be incorporated by reference and were set forth in its entirety herein.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A measuring device for a casing of a deep boring, comprising:
   at least one electrical measuring cable insertable into the casing and having a first cable end connectable to at least one measuring equipment of the measuring device and a further cable end,
   at least one measuring head in form of a wire brush head arranged on the further cable end and having at least two electrically conductive connecting element each comprising a contact end configured to contact an inner wall of the casing,
   at least one ground contact element connectable to the measuring equipment,
   wherein the measuring equipment is configured to measure at least one electrical parameter dependent on at least one electrical protection parameter applied to the casing.

2. The measuring device according to claim 1, wherein the contact end of the at least one connecting element is configured to contact the inner wall of the casing at at least one specific measuring depth such that an electrically conductive connection is established between the inner wall at the specific measuring depth and at least one measuring line of the measuring cable.

3. The measuring device according to claim 1, wherein the measuring device comprises at least one evaluation equipment configured to determine a sufficient corrosion protection based on the at least one measured electrical parameter and at least one specific corrosion protection criterion.

4. The measuring device according to claim 3, wherein the measuring device comprises at least one protection parameter setting equipment configured to set the at least one electrical protection parameter based on the evaluation result.

5. The measuring device according to claim 1, wherein the length of the measuring cable corresponds to at least 70% of the length of the casing.

6. The measuring device according to claim 2, wherein the measuring cable comprises the at least one measuring line that is electrically conductive and electrically connected to a further end of the at least one connecting element,
   the measurement line is surrounded by at least one insulation sheath.

7. The measuring device according to claim 1, wherein the measuring head comprises at least one weight element, and/or
   the measuring head comprises at least one fastening element configured to fasten at least one weight element.

8. The measuring device according to claim 1, wherein the measuring head comprises a first connecting element of the at least two connecting elements extending in a first radial direction and at least a second connecting element of the at least two connecting elements extending in a second radial direction,
   the first radial direction is a substantially opposite radial direction to the second radial direction.

9. The measuring device according to claim 8, wherein the ratio of a contact end distance between a first contact end of the first connecting element and a second contact end of the second connecting element to an inner diameter is at least greater than 1.001.

10. The measuring device according to claim 1, wherein the measuring head with the at least two connecting elements is formed as a wire brush head with a plurality of radially outwardly extending wire elements as connecting elements.

11. The measuring device according to claim 1, wherein
a coupling mechanism is arranged at the further cable end of the measuring cable,
the coupling mechanism is configured to releasably couple the further cable end to a measuring head,
the at least one measuring head is selectable from at least two different measuring heads.

12. A measuring set, comprising:
at least one measuring device according to claim 1, and
at least two different measuring heads each configured to releasably couple to a coupling mechanism of the measuring cable.

13. A measuring vehicle comprising at least one measuring device according to claim 1 installed on the measuring vehicle.

14. A measuring system, comprising
at least one measuring device according to claim 1, and
at least one protection device in form of a cathodic corrosion protection device.

15. A measuring method, comprising:
providing at least one measuring device according to claim 1,
inserting the measuring cable with the measuring head into the casing to at least a first specific measuring depth,
measuring at least one electrical measuring parameter dependent on at least one electrical protection parameter applied to the casing at a first contact end of the measuring cable and the ground contact element.

16. The measuring device according to claim 5, wherein the length of the measuring cable corresponds to at least 90% of the length of the casing.

17. The measuring device according to claim 16, wherein the length of the measuring cable corresponds to at least 100% of the length of the casing.

18. The measuring device according to claim 9, wherein the ratio of the contact end distance between the first contact end of the first connecting element and the second contact end of the second connecting element to the inner diameter is at least greater than 1.01.

19. The measuring device according to claim 18, wherein the ratio of the contact end distance between the first contact end of the first connecting element and the second contact end of the second connecting element to the inner diameter is at least greater than 1.1.

20. A measuring device for a casing of a deep boring, comprising:
at least one electrical measuring cable insertable into the casing and having a first cable end connectable to at least one measuring equipment of the measuring device and a further cable end,
at least one measuring head arranged on the further cable end and having at least two electrically conductive connecting element each comprising a contact end configured to contact an inner wall of the casing,
at least one ground contact element connectable to the measuring equipment,
wherein the measuring equipment is configured to measure at least one electrical parameter dependent on at least one electrical protection parameter applied to the casing,
a coupling mechanism is arranged at the further cable end of the measuring cable,
wherein the coupling mechanism is configured to releasably couple the further cable end to the measuring head,
wherein the at least one measuring head is selectable from at least two different measuring heads.

* * * * *